April 10, 1951 C. W. ROSENBARGER 2,548,242
TRUNK LID LOCKING DEVICE FOR AUTOMOBILES
Filed Nov. 28, 1947
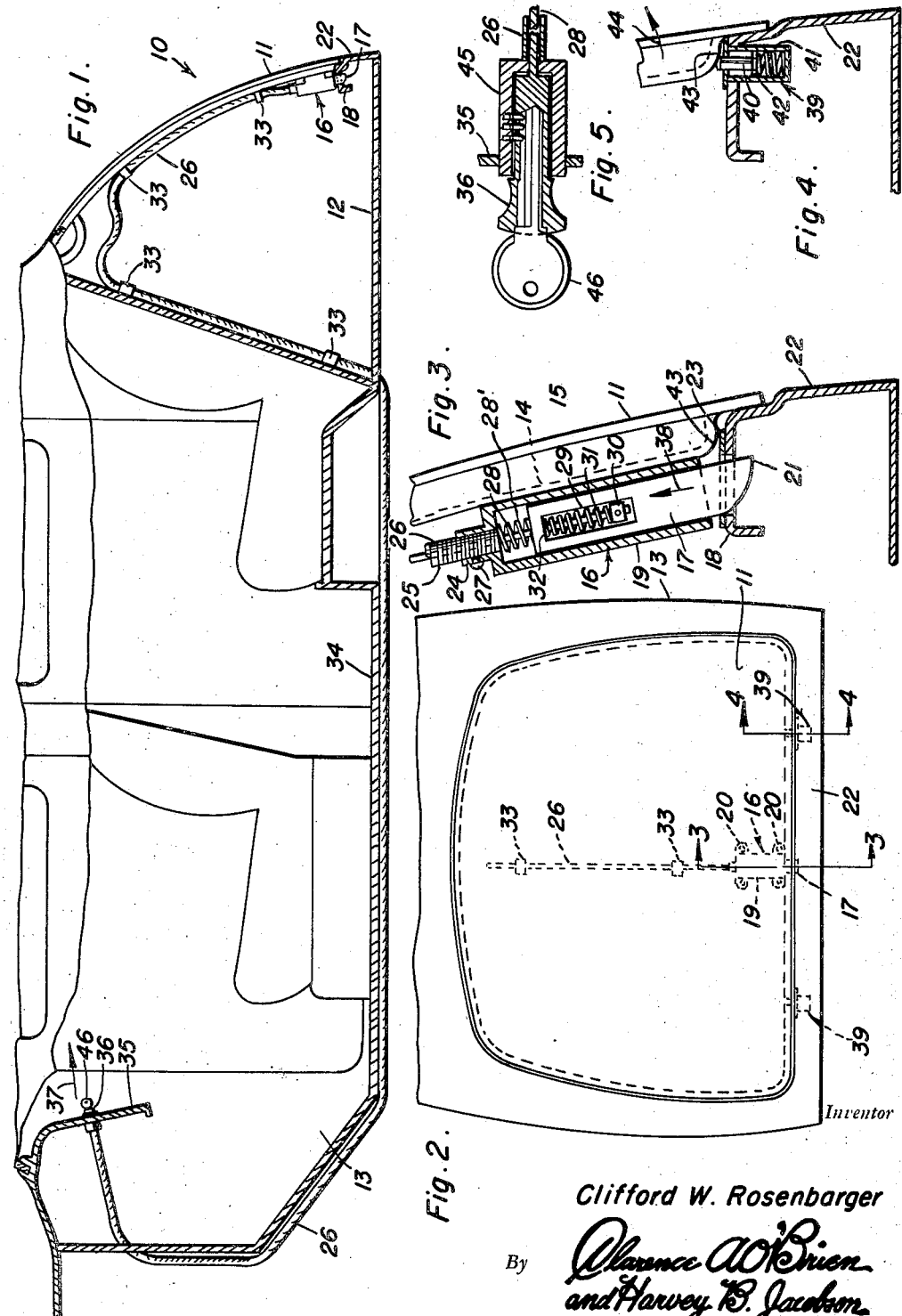
Inventor
Clifford W. Rosenbarger
By Clarence A. O'Brien
and Harvey B. Jackson
Attorneys Patented Apr. 10, 1951

2,548,242

UNITED STATES PATENT OFFICE 2,548,242

TRUNK LID LOCKING DEVICE FOR AUTOMOBILES

Clifford W. Rosenbarger, Indianapolis, Ind., assignor of fifteen per cent to Gus Edwin Rosenbarger, seven and one-half per cent to Roy Clifford Rosenbarger, and seven and one-half per cent to Cecilia M. Rosenbarger, Indianapolis, Ind.

Application November 28, 1947, Serial No. 788,555

1 Claim. (Cl. 292—171)

This invention relates to new and useful improvements and structural refinements in trunk lid locking devices for automobiles and like vehicles, and the principal object of the invention is to provide a device of the character herein described which is remotely controlled, as it were, being operated by means of a control button on the instrument panel of the vehicle on which it is used.

A further object of the invention is to provide a trunk lid locking device which eliminates the use of the conventional trunk handle and lock and by the use of which the trunk will be automatically locked upon closing of the lid, until such time as it is unlocked by the manipulation of the aforementioned instrument panel button. It will be apparent that by virtue of this arrangement, unlocking of the trunk lid will be impossible unless access is had to the interior of the vehicle.

Another object of the invention is to provide a trunk lid locking device wherein the lid is automatically urged into a partially open position as soon as the locking mechanism is unlocked or released.

An additional object of the invention is to provide a trunk lid locking device which is simple in construction, which will readily lend itself to use on vehicles of various types and makes, and which will not easily become damaged.

With the above more important objects in view, and such other objects as may become apparent as this specification proceeds, the invention consists essentially of the arrangement and construction of parts as illustrated in the accompanying drawings, in which:

Figure 1 is a fragmentary cross-sectional view of a vehicle showing the invention associated therewith;

Figure 2 is a rear elevational view of the subject shown in Figure 1;

Figure 3 is a cross-sectional view, taken substantially in the plane of the line 3—3 in Figure 2;

Figure 4 is a cross-sectional view, taken substantially in the plane of the line 4—4 in Figure 2; and Figure 5 is a cross-sectional view of a locking means for the pull button.

Like characters of reference are used to designate like parts in the specification and throughout the several views.

Referring now to the accompanying drawings in detail, the invention is designated generally by the reference character 10, consisting of a locking device for the lid 11 of a trunk 12 of any suitable automobile 13.

The lid 11 is usually of a "double wall" construction, including the inner and outer walls 14, 15, respectively, and the device 10 embodies a latch unit designated generally by the reference character 16 which includes a projectable bolt 17 and a coacting catch 18.

The bolt 17 assumes the form of a plunger which is slidably disposed in a housing or sleeve 19 secured as at 20 to the inner trunk lid wall 14, one end portion of the bolt terminating in a rounded, pointed extremity or tongue 21 which is projectably retractable with respect to the housing 19 and is engageable with the aforementioned catch 18.

The catch 18 simply assumes the form of a suitable opening provided in an inturned flange of the trunk skirt 22, as will be clearly apparent. If desired, the opening of the catch 18 may be reinforced, so to speak, by means of a suitable plate or washer 23, as is best shown in Figure 3.

The aforementioned housing 19 is provided with a tubular socket 24 adapted to receive one end portion of the casing 25 of a flexible "Bowden" cable 26. The casing 25 is secured in the socket 24 by means of a suitable set screw 27 with which the socket is provided, and the inner, slidable cable element 28 of the Bowden unit 26 extends into a recess 29 with which the bolt 17 is formed. A collar 30 is secured at the end of the cable member 28 and a compression spring 31 is interposed between this collar and the inner end 32 of the recess 29, as will be clearly apparent from Figure 3.

The Bowden cable 26 is secured by means of suitable clips 33 to the framework of the vehicle 13, and after emerging from the trunk 12, the cable 26 is taken under the floor board 34 of the vehicle and to the instrument panel 35 of the same, at which point it is provided with a suitable actuating pull button 36.

It will be seen from the foregoing that when the button 36 is pulled in the direction of the arrow 37, the bolt 17 will be pulled upwardly in the direction of the arrow 38 (after the resiliency of the spring 31 has been overcome), and as a result the tongue 21 will be withdrawn from the catch 18.

In this manner, the trunk will be "unlocked," and to facilitate the opening of the trunk lid 11, a pair of ejector units 39 are provided, each of these consisting of a projectable pin 40 pressed by a compression spring 41 which, in turn, is housed in a sleeve 42 mounted or attached to the inturned flange of the trunk skirt 22. The springs 41 normally urge the pins 40 upwardly in contact with the arcuate portion 43 of the inner trunk lid wall 14, so that upon releasing of the latch unit 16, the lid 11 will be urged into a partially opened position, in the direction of the arrow 44.

The lid 11 may then be opened in the usual manner, and after the lid is closed, the pins 40 will, of course, be depressed and the tongue 21 will be brought in engagement with the catch 18.

As will be clearly apparent, the primary purpose of the spring 31 is to return the pull button 36 to its normal, in-drawn position after the trunk lid is closed, so that the button is in readiness for the next unlocking operation. Needless to say, a suitable spring 28' may be provided on the cable 28 in the housing 19 for urging the bolt 17 in locking engagement with the catch 18, as is common practice in the art.

If desired, locking means may be associated with the aforementioned button 36, this being accomplished by slidably positioning the button in a lock cylinder 45 mounted on the panel 35, and equipping the button with a suitable key 46. By virtue of this arrangement, opening of the trunk lid by unauthorized persons will be prevented, even though such persons have gained access to the interior of the vehicle.

It is believed that the advantages and use of the invention will be clearly apparent from the foregoing disclosure, and accordingly, further description thereof at this point is deemed unnecessary.

Having described the invention, what is claimed as new is:

In a remotely controlled latching device, the combination of an elongated housing, a bolt slidable in said housing and projectable outwardly therefrom to a locking position, resilient means for projecting said bolt, one end of said housing being formed with a socket, a flexible control cable including a slidable inner member and a stationary casing secured in said socket, said bolt being formed with a longitudinally extending and open sided recess having inner and outer ends, the inner member of said cable extending in said housing and in the recess of said bolt, a collar secured to said cable member in said recess, and a compression spring provided on said cable member between the inner end of said recess and said collar, whereby said cable member is urged in the direction of the locking position of said bolt.

CLIFFORD W. ROSENBARGER.

REFERENCES CITED

The following references are of record in the file of this patent:

UNITED STATES PATENTS

| Number | Name | Date |
|---|---|---|
| 1,824,352 | Isaacs | Sept. 22, 1931 |
| 2,035,895 | Kelly | Mar. 31, 1936 |
| 2,047,401 | Whitted | July 14, 1936 |
| 2,084,045 | Olsen | June 15, 1937 |
| 2,200,346 | Sepull | May 14, 1940 |